United States Patent
Hirose et al.

(10) Patent No.: US 10,246,537 B2
(45) Date of Patent: Apr. 2, 2019

(54) RESIN COMPOSITION CONTAINING ETHYLENE-VINYL ALCOHOL COPOLYMER, MOLDED PRODUCT, AND MULTILAYER STRUCTURE

(71) Applicant: KURARAY CO., LTD., Kurashiki-shi (JP)

(72) Inventors: Wataru Hirose, Kurashiki (JP); Takeyuki Igarashi, Okayama (JP)

(73) Assignee: KURARAY CO., LTD., Kurashiki-shi (JP)

( * ) Notice: Subject to any disclaimer, the term of this patent is extended or adjusted under 35 U.S.C. 154(b) by 42 days.

(21) Appl. No.: 15/506,862

(22) PCT Filed: Aug. 19, 2015

(86) PCT No.: PCT/JP2015/073283
§ 371 (c)(1),
(2) Date: Feb. 27, 2017

(87) PCT Pub. No.: WO2016/031652
PCT Pub. Date: Mar. 3, 2016

(65) Prior Publication Data
US 2017/0275403 A1  Sep. 28, 2017
US 2018/0148528 A2  May 31, 2018

(30) Foreign Application Priority Data

Aug. 28, 2014 (JP) .................. 2014-174232

(51) Int. Cl.
| | | |
|---|---|---|
| C08L 53/00 | (2006.01) | |
| C08L 29/04 | (2006.01) | |
| C08F 216/06 | (2006.01) | |
| B32B 27/28 | (2006.01) | |
| C08J 5/18 | (2006.01) | |
| C08F 210/02 | (2006.01) | |
| C08F 210/10 | (2006.01) | |
| C08F 297/08 | (2006.01) | |
| B32B 27/30 | (2006.01) | |

(52) U.S. Cl.
CPC ........... *C08F 216/06* (2013.01); *B32B 27/28* (2013.01); *B32B 27/306* (2013.01); *C08F 210/02* (2013.01); *C08F 210/10* (2013.01); *C08F 297/08* (2013.01); *C08J 5/18* (2013.01); *C08L 29/04* (2013.01); *C08L 53/00* (2013.01); *C08L 2205/04* (2013.01)

(58) Field of Classification Search
CPC .................................................... C08L 53/005
See application file for complete search history.

(56) References Cited

U.S. PATENT DOCUMENTS

| | | | |
|---|---|---|---|
| 5,895,797 A | 4/1999 | Hayashihara et al. | |
| 2008/0113135 A1* | 5/2008 | Kato | B32B 27/08 428/35.8 |
| 2012/0052225 A1 | 3/2012 | Kani et al. | |
| 2015/0336361 A1* | 11/2015 | Masaki | B32B 27/08 428/220 |
| 2015/0372263 A1* | 12/2015 | Douke | H01M 2/0275 429/176 |

FOREIGN PATENT DOCUMENTS

| | | |
|---|---|---|
| EP | 0 814 126 A1 | 12/1997 |
| JP | 10-1579 A | 1/1998 |
| JP | 10-110086 A | 4/1998 |
| JP | 2000-157627 A | 6/2000 |
| JP | 2009-149711 A | 7/2009 |
| JP | 2011-6673 A | 1/2011 |

OTHER PUBLICATIONS

Extended European Search Report dated Mar. 13, 2018 in European Patent Application No. 15836377.0, 6 pages.
International Search Report dated Nov. 17, 2015, in PCT/JP2015/073283 filed Aug. 19, 2015.
Nakabayashi, et al., "Properties and Applications of Polyisobutylene-based Thermo Plastic Elastomer", Journal of the Society of Rubber Industry, vol. 83, No. 9, 2010, 5 pages (with English Abstract).

* cited by examiner

*Primary Examiner* — Jeffrey C Mullis
(74) *Attorney, Agent, or Firm* — Oblon, McClelland, Maier & Neustadt, L.L.P.

(57) ABSTRACT

A resin composition according to an aspect of the present invention comprises: an ethylene-vinyl alcohol copolymer (A); and a block copolymer (B) having a block (b1) that includes a vinyl aromatic monomer unit, and a block (b2) that includes an isobutylene unit, wherein the ethylene-vinyl alcohol copolymer (A) and the block copolymer (B) form a co-continuous phase structure; and a DSC curve obtained following heating the resin composition up to a melting point and cooling at a rate of 50° C./min in a differential scanning calorimetry analysis shows two peaks, with a higher peak top temperature falling within a range of 130° C. or greater and 170° C. or less, and a lower peak top temperature falling within a range of 100° C. or greater and less than 130° C. A resin composition may thus be obtained that is able to give a molded article that is superior in balance between gas barrier properties and flexibility.

16 Claims, 3 Drawing Sheets

RESIN COMPOSITION CONTAINING ETHYLENE-VINYL ALCOHOL COPOLYMER, MOLDED PRODUCT, AND MULTILAYER STRUCTURE

TECHNICAL FIELD

The present invention relates to a resin composition containing an ethylene-vinyl alcohol copolymer, a molded product, and a multilayer structure.

BACKGROUND ART

A packaging material for foodstuffs in forms of film, sheet, bag, bottle, etc.; a packing material for containers used for a seal between a beverage bottle and a crown cap, a seal between a medical drug bottle and a lid, etc.; a material for medical infusion bags; a tube material for tires; a cushion material for shoes; and the like are required to have gas barrier properties and flexibility.

For example, for a packaging material for food and beverages, a laminate comprising a flexible resin layer and a gas barrier layer formed from an ethylene-vinyl alcohol copolymer or from a polyamide is widely used since flexibility and a high degree of gas barrier properties are required. For a packing material for containers, NR (natural rubber) and/or IIR (butyl rubber) are generally used since flexibility and gas barrier properties are required. For a material for medical infusion bags, vinyl chloride is generally used since flexibility and gas barrier properties are required. For a tube material for tires, IIR is generally used since a high degree of gas barrier properties and flexibility are required.

However, in order for the aforementioned molded articles obtained by employing NR and/or IIR to develop flexibility, a complex vulcanizing step is required after molding. In the packaging material for food and beverages, because of being superior in gas barrier properties but having insufficient flexibility, the ethylene-vinyl alcohol copolymer or polyamide is used in a form of a laminate with a flexible resin layer for compensating the insufficiency, leading to restriction and complexity in molding processing. NR does not have a very high degree of gas barrier properties, and therefore is disadvantageous for use as a packing material for containers etc., in terms of a long term storability of a content. Meanwhile, since vinyl chloride contains a large amount of chlorine atoms, molded articles such as medical infusion bags formed from vinyl chloride are feared to have a negative impact on environment due to gas such as hydrogen chloride generated upon incineration disposal.

In this regard, as a polymeric material that is superior in flexibility and not requiring a vulcanizing step, thermoplastic elastomers such as SEBS (a styrene-ethylene/butylene-styrene triblock copolymer) and SEPS (a styrene-ethylene/propylene-styrene triblock copolymer) have been proposed. However, gas barrier properties of these thermoplastic elastomers may be insufficient depending on intended use.

In this regard, as a resin composition that gives a molded product usable for a packaging material for food and beverages, a packing material for containers, a material for medical infusion bags, a tube material for tires, etc., resin compositions each containing: a block copolymer having a polymer block that includes a vinyl aromatic monomer unit, and a polymer block that includes an isobutylene unit; and an ethylene-vinyl alcohol copolymer have been proposed (refer to Patent Document 1 and Patent Document 2). The resin composition disclosed in Patent Document 1 is characterized in that the ethylene-vinyl alcohol copolymer is present as a dispersed particle phase in a matrix phase of the block copolymer. Whereas, the resin composition disclosed in Patent Document 2 is characterized in that the block copolymer is present as a dispersed particle phase in a matrix phase of the ethylene-vinyl alcohol copolymer.

The resin composition disclosed in Patent Document 1 is reportedly capable of providing molded articles that are superior not only in flexibility, but also in gas barrier properties. Meanwhile, the resin composition disclosed in Patent Document 2 reportedly results in an improvement of flexibility of molded articles while leveraging gas barrier properties of the ethylene-vinyl alcohol copolymer.

However, the present inventors have investigated to find that a balance between gas barrier properties and flexibility of the molded articles formed from the aforementioned resin compositions can be further improved.

Among the aforementioned resin compositions, the resin composition containing an ethylene-vinyl alcohol copolymer as a matrix phase is, as appropriate according to intended use, generally used as a gas barrier layer in a multilayer structure having an appropriate polyolefin layer (e.g., a polyethylene layer, etc.). However, since an ethylene-vinyl alcohol copolymer has poor adhesiveness to a polyolefin, an adhesive layer or an adhesive is required between layers in order to form a multilayer structure with an ethylene-vinyl alcohol copolymer, leading to restriction and complexity in molding processing.

PRIOR ART DOCUMENTS

Patent Documents

Patent Document 1: Japanese Unexamined Patent Application, Publication No. H10-110086
Patent Document 2: Japanese Unexamined Patent Application, Publication No. H10-1579

SUMMARY OF THE INVENTION

Problems to be Solved by the Invention

The present invention was made in view of the foregoing circumstances, and an objective thereof is to provide a resin composition that gives a molded article superior in balance between gas barrier properties and flexibility. Another objective of the present invention is to provide a multilayer structure that is superior in interlayer adhesiveness to such a degree that, particularly in the case of a multilayer structure having a polyolefin layer, an adhesive layer or adhesive is not required between a layer formed from the resin composition according to an aspect of the present invention and the polyolefin layer.

Means for Solving the Problems

According to an aspect of the invention made for solving the aforementioned problems, a resin composition comprises: an ethylene-vinyl alcohol copolymer (A) (hereinafter, may be also referred to as "EVOH (A)"); and a block copolymer (B) (hereinafter, may be also referred to as "block copolymer (B)") having a block (b1) that includes a vinyl aromatic monomer unit (hereinafter, may be also referred to as "polymer block (b1)") and a block (b2) that includes an isobutylene unit (hereinafter, may be also referred to as "polymer block (b2)"), wherein the ethylene-vinyl alcohol copolymer (A) and the block copolymer (B) form a co-continuous phase structure; and a DSC curve obtained following heating the resin composition up to a melting point and cooling at a rate of 50° C./min in a differential scanning calorimetry analysis shows two peaks, with a higher peak top temperature falling within a range of 130° C. or greater and 170° C. or less, and a lower peak top temperature falling within a range of 100° C. or greater and less than 130° C.

A molded product according to another aspect of the present invention is formed from the resin composition.

A multilayer product according to yet another aspect of the present invention has a layer formed from the resin composition.

Effects of the Invention

The resin composition according to one aspect of the present invention is able to give a molded article that is superior in balance between gas barrier properties and flexibility, and in adhesiveness to a polyolefin layer. The resin composition according to the one aspect of the present invention is suitably used for a molded product and a multilayer structure. The molded product and the multilayer structure can be suitably used as a packaging material for food and beverages, a packing material for containers, a material for medical infusion bags, a tube material for tires, or a cushion material for shoes.

DESCRIPTION OF EMBODIMENTS

<Resin Composition>

Figure 1:
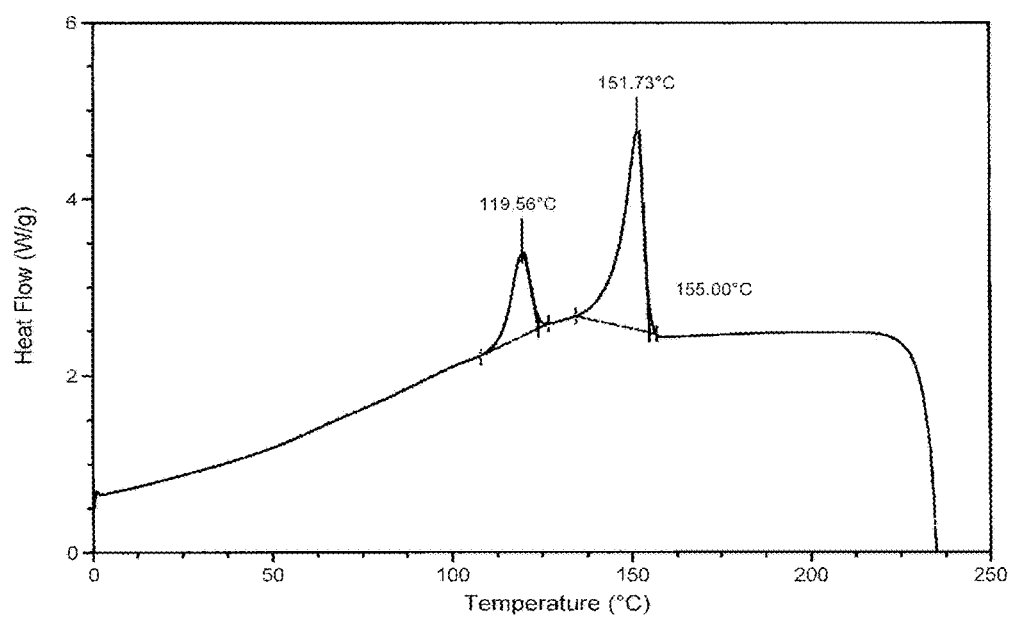
FIG. 1 is a chart indicating a DSC curve for a resin composition obtained in Example 1.

A resin composition according to an embodiment of the present invention is described hereinafter. The resin composition comprises the EVOH (A) and the block copolymer (B), the EVOH (A) and the block copolymer (B) forming a co-continuous phase structure, and a DSC curve obtained following heating the resin composition up to a melting point and cooling at a rate of 50° C./min in a differential scanning calorimetry analysis showing two peaks, with a higher peak top temperature falling within a range of 130° C. or greater and 170° C. or less, and a lower peak top temperature falling within a range of 100° C. or greater and less than 130° C. With the two peaks in the DSC curve falling within the aforementioned ranges, respectively, the resin composition is superior in gas barrier properties and flexibility, and, in the case of a multilayer structure, interlayer adhesiveness between the layer formed from the resin composition and the polyolefin layer is superior.

EVOH (A)

The EVOH (A) is a copolymer having an ethylene unit and a vinyl alcohol unit. The EVOH (A) is obtained by, for example, saponifying a copolymer composed of ethylene and a vinyl ester by using an alkali catalyst and the like. A typical example of the vinyl ester is vinyl acetate; however, other fatty acid vinyl esters (vinyl propionate, vinyl pivalate, etc.) may also be used. In addition, the EVOH (A) may contain a vinyl silane compound as a copolymer component. Examples of the vinyl silane compound include vinylmethoxysilane, vinyltriethoxysilane, vinyltri(β-methoxyethoxy) silane, γ-methacryloxypropylmethoxysilane, and the like. Of these, vinylmethoxysilane and vinyltriethoxysilane are suitably used as the vinyl silane compound. Furthermore, the EVOH (A) may also have, as the copolymer component, other comonomer such as: an unsaturated carboxylic acid such as propylene, butylene, (meth)acrylic acid, and methyl (meth)acrylate, or an ester thereof; a vinyl pyrrolidone such as N-vinyl pyrrolidone; and the like, within a range not leading to inhibition of the effects of the present invention.

The lower limit of an ethylene content of the EVOH (A) is preferably 20 mol %, more preferably 25 mol %, and further more preferably 27 mol %. The upper limit of the ethylene content of the EVOH (A) is preferably 60 mol %, more preferably 55 mol %, and further more preferably 50 mol %. In the case of the ethylene content being less than the lower limit, melt formability of the resin composition may be inferior. To the contrary, in the case of the ethylene content being greater than the upper limit, gas barrier properties of the resin composition may be inferior.

The lower limit of a degree of saponification of the EVOH (A) is not particularly limited and preferably 90 mol %, more preferably 95 mol %, and further more preferably 99 mol %. The degree of saponification of the EVOH (A) falling within the above specified range is preferred in light of maintaining gas barrier properties of the resin composition.

The lower limit of a melt flow rate (MFR) of the EVOH (A) (measured by a method defined in ASTM D1238, under conditions involving a temperature of 230° C. and a load of 2,160 g) is preferably 1.0 g/10 min, more preferably 2.5 g/10 min, and further more preferably 5.0 g/10 min. Meanwhile, the upper limit of the MFR of the EVOH (A) is preferably 100 g/10 min, more preferably 50 g/10 min, and further more preferably 20 g/10 min. By using the EVOH (A) exhibiting such a MFR, the resin composition may have favorable moldability, processability, and the like.

The EVOH (A) may be used alone or two or more types thereof may be used in mixture.

Block Copolymer (B)

The block copolymer (B) has the polymer block (b1) that includes a vinyl aromatic monomer unit, and the polymer block (b2) that includes an isobutylene unit. The block copolymer (B) may have two or more polymer blocks (b1). Meanwhile, the block copolymer (B) may have two or more polymer blocks (b2).

The block copolymer (B) is acceptable as long as at least one polymer block (b1) and at least one polymer block (b2) are included in a molecule, and a structure thereof is not particularly limited. The block copolymer (B) may have anyone of molecular chain forms of: a linear chain; a branched chain with two or more branches; and a star-shaped chain. The block copolymer (B) typically has: a diblock structure represented by b1-b2; a triblock structure represented by b1-b2-b1 or b2-b1-b2; a tetrablock structure represented by b1-b2-b1-b2; a polyblock structure in which five or more in total of b1 and b2 are linearly bound; or a mixture thereof.

The vinyl aromatic monomer unit, which is a constitutional unit of the polymer block (b1), is derived from a vinyl aromatic monomer by means of addition polymerization. Examples of the vinyl aromatic monomer include: styrenes such as styrene, α-methylstyrene, 2-methylstyrene and 4-methylstyrene; vinyl group-containing aromatic compounds such as 1-vinylnaphthalene and 2-vinylnaphthalene; and the like. The vinyl aromatic monomer unit constituting the polymer block (b1) may be either of only one type or of two or more types. Of these, it is preferred that the polymer block (b1) is constituted with the styrene units.

The lower limit of a number average molecular weight of the polymer block (b1) is preferably 2,500, and more preferably 5,000. Meanwhile, the upper limit of the number average molecular weight is preferably 400,000, and more preferably 200,000. In the case of the number average molecular weight of the polymer block (b1) being equal to or greater than the lower limit, the block copolymer (B) has favorable mechanical characteristics, and in turn the resin composition has favorable mechanical characteristics. On the other hand, in the case of the number average molecular weight of the polymer block (b1) being equal to or less than the upper limit, melt viscosity of the block copolymer (B) will not be excessively high, enabling easy mixing with the EVOH (A), whereby the resin composition will have favorable moldability, processability, and the like. It is to be noted that each of the number average molecular weight of the polymer block (b1) and the number average molecular weight of the polymer block (b2) (described later) means the sum of atomic weight of atoms constituting the polymer block (b1) or the polymer block (b2), and can be calculated by multiplying the number average molecular weight of the block copolymer (B) by a proportion of the polymer block (b1) or a proportion of the polymer block (b2).

The isobutylene unit, which is a constitutional unit of the polymer block (b2) in the block copolymer (B) is a unit (—C(CH$_3$)$_2$—CH$_2$—) derived from isobutylene by means of addition polymerization.

The lower limit of the number average molecular weight of the polymer block (b2) is preferably 10,000. The upper limit of the number average molecular weight of the polymer block (b2) is preferably 400,000. In the case of the number average molecular weight of the polymer block (b2) being equal to or greater than the lower limit, the block copolymer (B) has particularly favorable gas barrier properties, and in turn the resin composition also has particularly favorable gas barrier properties. On the other hand, in the case of the number average molecular weight of the polymer block (b2) being equal to or less than the upper limit, the block copolymer (B) has favorable fluidity, and in turn the resin composition has favorable moldability, processability, and the like.

The lower limit of a number average molecular weight of the block copolymer (B) is preferably 20,000, and more preferably 30,000. Meanwhile, the upper limit of the number average molecular weight is preferably 500,000, and more preferably 400,000. In the case of the number average molecular weight of the block copolymer (B) being equal to or greater than the lower limit, the block copolymer (B), and in turn the resin composition, have favorable mechanical characteristics such as strength and ductility. On the other hand, in the case of the number average molecular weight of the block copolymer (B) being equal to or less than the upper limit, the block copolymer (B) has favorable fluidity, and in turn the resin composition has favorable moldability, processability, and the like.

Proportions of the polymer block (b1) and the polymer block (b2) in the block copolymer (B) may be appropriately defined. The lower limit of the proportion of the polymer block (b1) in the block copolymer (B) is preferably 5% by mass, more preferably 10% by mass, further more preferably 15% by mass, and particularly preferably 20% by mass with respect to a mass of the block copolymer (B). The upper limit of the proportion of the polymer block (b1) is preferably 80% by mass, more preferably 70% by mass, further more preferably 60% by mass, and particularly preferably 50% by mass with respect to the mass of the block copolymer (B). The lower limit of a proportion of the polymer block (b2) in the block copolymer (B) is preferably 20% by mass, more preferably 30% by mass, further more preferably 40% by mass, and particularly preferably 50% by mass with respect to the mass of the block copolymer (B). The upper limit of the proportion of the polymer block (b2) is preferably 95% by mass, more preferably 90% by mass, further more preferably 85% by mass, and particularly preferably 80% by mass with respect to the mass of the block copolymer (B). In the case of the ratio of the polymer block (b1) being equal to or greater than the lower limit, the block copolymer (B), and in turn the resin composition, have favorable mechanical characteristics such as strength and ductility. On the other hand, in the case of the ratio of the polymer block (b1) being equal to or less than the upper limit, melt viscosity of the block copolymer (B) will not be excessively high, enabling the resin composition to have favorable moldability, processability, and the like. It is to be noted that, in the case of the block copolymer (B) having a plurality of polymer blocks (b1), a percentage by mass of the polymer block (b1) is a sum of percentages by mass of the polymer blocks (b1). In a similar way, in the case of the block copolymer (B) having a plurality of polymer blocks (b2), a percentage by mass of the polymer block (b2) is a sum of percentages by mass of the polymer blocks (b2).

The lower limit of a melt flow rate (MFR) of the block copolymer (B) (measured by the method defined in ASTM D1238, under conditions involving a temperature of 230° C. and a load of 2,160 g) is preferably 1.0 g/10 min, more preferably 2.5 g/10 min, and further more preferably 5.0 g/10 min. Meanwhile, the upper limit of the MFR of the block copolymer (B) is preferably 100 g/10 min, more preferably 50 g/10 min, and further more preferably 20 g/10 min. By using the block copolymer (B) exhibiting such a MFR, the resin composition may have favorable moldability, processability, and the like.

In addition, a functional group may be introduced to the block copolymer (B) by an arbitrary procedure, within a range not leading to impairment of the effects of the present invention. Examples of the functional group that may be introduced to the block copolymer (B) include: a hydroxyl group; an amino group; an alkylamino group; ether groups such as an epoxy group, and an alkoxyl group; a carboxy group; ester groups such as an alkoxycarbonyl group, and an acyloxyl group; amide groups such as a carbamoyl group, an alkylcarbamoyl group, and an acylamino group; groups having a structure of a dicarboxylic acid anhydride such as a maleic anhydride residue; and the like.

A production method of the block copolymer (B) is not particularly limited, and an example thereof is a method, according to a conventional procedure, including: using a polymerization initiator system to perform a polymerizing operation of the vinyl aromatic monomer and a polymerizing operation of isobutylene in an inert solvent in a stepwise manner in an arbitrary order; and then, as desired, using a compound having a functional group to permit modification. In this case, examples of the polymerization initiator system include a mixed system of a Lewis acid and an organic compound that is capable of generating a cationic polymerization active species in the presence of the Lewis acid. As the inert solvent for polymerization, organic solvents such as hexane, cyclohexane, methylcyclohexane, methyl chloride, and methylene chloride may be used.

The linear block copolymer (B) can be produced by, for example, a method including: using as the polymerization initiator system an organic compound having in a molecule one, two, or three functional groups that are capable of generating a Lewis acid and a cationic polymerization active species; adding isobutylene to a reaction system, thereby permitting polymerization to form the polymer block (b2); and allowing the vinyl aromatic monomer to be polymerized, thereby forming the polymer block (b1).

In the resin composition, the EVOH (A) and the block copolymer (B) form a co-continuous phase structure. Here, "the EVOH (A) and the block copolymer (B) form a co-continuous phase structure" as referred to means that a phase composed of the EVOH (A) and a phase composed of the block copolymer (B) being phase-separated each form a continuous phase in a three-dimensional mesh shape, and encompasses not only the case in which the EVOH (A) and the block copolymer (B) form a continuous phase with each other, but also a case in which the EVOH (A) and the block copolymer (B) form a continuous phase with each other, with the continuous phase of the EVOH (A) having a region including an island phase of the block copolymer (B), and also with the continuous phase of the block copolymer (B) having a region including an island phase of the EVOH (A). It is to be noted that the co-continuous phase structure may be observed by using a transmission electron microscope (TEM).

A DSC curve obtained following heating the resin composition up to a melting point and cooling at a rate of 50° C./min in a differential scanning calorimetry (DSC) analysis shows two peaks, with a higher peak top temperature falling within a range of 130° C. or greater and 170° C. or less, and a lower peak top temperature falling within a range of 100° C. or greater and 130° C. or less. The peak observed within the temperature range of 130° C. or greater and 170° C. or less (exothermic peak) is supposed to be a consequence of the EVOH (A) having been crystallized with cooling. Whereas the peak observed within the temperature range of 100° C. or greater and less than 130° C. (exothermic peak) is supposed to result from a part of the EVOH (A), not having been crystallized at 130° C. or greater but having been crystallized at a temperature less than 130° C.

In a case in which the resin composition is used for a purpose that necessitates heat resistance, the lower limit of the temperature range of the higher peak top temperature is preferably 140° C., more preferably 150° C., and further more preferably 160° C. Meanwhile, the lower limit of the temperature range of the lower peak top temperature is preferably 105° C., more preferably 110° C., further more preferably 115° C., and particularly preferably 125° C. In a case in which the resin composition is used for a purpose that necessitates flexibility, the upper limit of the temperature range of the higher peak top temperature is preferably 160° C., more preferably 150° C., and further more preferably 140° C. Meanwhile, the upper limit of the temperature range of the lower peak top temperature in this case is preferably 125° C., more preferably 115° C., further more preferably 110° C., and particularly preferably 105° C.

The lower limit of a mass ratio of the EVOH (A) to the block copolymer (B) (A/B) in the resin composition is preferably 52/48, more preferably 57/43, further more preferably 58/42, and particularly preferably 59/41. The upper limit of the mass ratio (A/B) is preferably 63/37, more preferably 62/38, and further more preferably 61/39.

The melt flow rate of the EVOH (A) at a temperature of 230° C. and under a load of 2,160 g measured in accordance with ASTM D1238 is preferably less than the melt flow rate of the block copolymer (B) at a temperature of 230° C. and under a load of 2,160 g.

In the case in which the mass ratio of the EVOH (A) to the block copolymer (B) falls within the aforementioned range and the melt flow rate of the EVOH (A) at a temperature of 230° C. and under a load of 2,160 g is less than the melt flow rate of the block copolymer (B) at a temperature of 230° C. and under a load of 2,160 g, the co-continuous phase structure of the EVOH (A) and the block copolymer (B) can be easily obtained, and characteristic features relating to the DSC curve can be easily attained.

The lower limit of a value obtained by subtracting the melt flow rate of the block copolymer (B) at a temperature of 230° C. and under a load of 2,160 g from the melt flow rate of the EVOH (A) is preferably 0.5 g/min, more preferably 3 g/min, and further more preferably 5.5 g/min. Meanwhile, the upper limit of the value obtained by subtracting the melt flow rate of the block copolymer (B) from the melt flow rate of the EVOH (A) is preferably 20 g/min, more preferably 10 g/min, and further more preferably 6.5 g/min. When the value obtained by subtracting the melt flow rate of the block copolymer (B) from the melt flow rate of the EVOH (A) falls within the above range, the co-continuous phase structure of the EVOH (A) and the block copolymer (B) can be easily obtained, and the characteristic features relating to the DSC curve can be easily attained.

From the resin composition, a molded product or a multilayer structure superior in flexibility can be obtained. The flexibility of the resin composition can be evaluated by forming a film from the resin composition and obtaining a storage elastic modulus thereof as an index. Specifically, the storage elastic modulus can be obtained by measuring at 23° C., a dynamic viscoelasticity of a 100-μm film formed from the resin composition, as determined by a method in accordance with JIS K 7244-4: 2010. The lower limit of the storage elastic modulus of the film at 23° C. is preferably 400 MPa, more preferably 600 MPa, and further more preferably 700 MPa. Meanwhile, the upper limit of the storage elastic modulus of the film at 23° C. is preferably 1,200 MPa, more preferably 1,000 MPa, and further more preferably 900 MPa.

Other Components

The resin composition may contain a compound such as various types of acids and metal salts, in light of thermal stability and viscosity adjustment. The compound is exemplified by a carboxylic acid, a phosphorus compound, a boron compound, and the like, of which specific examples are presented below. It is to be noted that these compounds may be used in a state of being mixed with the EVOH (A) beforehand.

Carboxylic acids: oxalic acid, succinic acid, benzoic acid, citric acid, acetic acid, lactic acid, etc.

Phosphorus compounds: various types of acids such as phosphoric acid and phosphorous acid, and salts thereof, etc.

Boron compounds: boric acids, borate ester, borate salt, boron hydride, etc.

In addition, various types of additives other than the aforementioned compounds may be blended into the resin composition as needed. Examples of the additives include an antioxidant, a plasticizer, an ultraviolet ray absorbing agent, an antistatic agent, a lubricant, a colorant, a filler, and the like, which may be blended within a range not leading to impairment of the operation and effects of the present invention.

Furthermore, a thermoplastic resin, a thermosetting resin and the like, other than the EVOH (A) and the block copolymer (B), may be blended into the resin composition, within a range not leading to inhibition of the effects of the present invention. Examples of the thermoplastic resin include: rubbers such as an EPR (ethylene-propylene rubber), an EPDM (ethylene-propylene-diene rubber), an NR (natural rubber), an isoprene rubber, a butadiene rubber, and an IIR (butyl rubber); resins such as polyethylene, polypropylene, polybutene, polyisobutylene, a polyamide, and a thermoplastic polyester; and the like. Examples of the thermosetting resin include an epoxy resin, an acrylic resin, a urethane resin, a thermosetting polyester, modified products of these resins or mixture thereof, and the like.

The upper limit of a content of the other components in the resin composition is preferably 10 parts by mass and more preferably 1 part by mass with respect to a total of the EVOH (A) and the block copolymer (B) being 100 parts by mass. It is to be noted that the resin composition may contain only the EVOH (A) and the block copolymer (B).

Production Method of Resin Composition

A production method of the resin composition is not particularly limited, and an example thereof is a method of sufficiently mixing or kneading the EVOH (A) and the block copolymer (B), as well as other polymer or an additive as desired, under a melting condition. Here, it is preferable that the mass ratio of the EVOH (A) to the block copolymer (B) is 52/48 or greater and 63/37 or less, and the melt flow rate of the EVOH (A) at a temperature of 230° C. and under a load of 2,160 g is less than the melt flow rate of the block copolymer (B) at a temperature of 230° C. and under a load of 2,160 g. In addition, in order to enable the EVOH (A) and the block copolymer (B) to form the co-continuous phase structure, it is desirable that the MFR of each component is appropriately selected on an experimental basis beforehand.

The mixing or the kneading under the melting condition may be performed by using, for example, a known mixing device or kneading device such as a kneader-extruder, an extruder, a mixing roll, a banbury mixer, etc. A temperature during the mixing or the kneading may be appropriately adjusted according to, e.g., a melting point of the EVOH (A) to be used; and generally a temperature falling within a temperature range of 160° C. or greater and 300° C. or less may be employed.

The resin composition may be processed into arbitrary forms such as pellets, powder, etc. and used as a molding material. The resin composition is able to give a molded article that is superior in balance between gas barrier properties and flexibility. The molded article formed from the resin composition is also superior in impact resistance. In addition, a multilayer structure having a layer formed from the resin composition exhibits superior adhesiveness to the polyolefin layer (in particular, a polyethylene layer and a polypropylene layer).

<Molded Product>

A molded product according to another embodiment of the present invention is formed from the resin composition of the embodiment described above.

The resin composition is thermoplastic and thus may be molded by using a conventional molding process and a conventional molding apparatus used for general thermoplastic polymers. As the molding process, an arbitrary process such as injection molding, extrusion molding, press molding, blow molding, calender molding, vacuum forming, etc. may be employed. The molded product produced from the resin composition by such a process encompasses products having a wide variety of shapes, such as a molded object, a pipe, a sheet, a film, a disk, a ring, a bag-shaped object, a bottle-shaped object, a cord-shaped object, a fibrous object, and the like. A preferred shape of the molded product is a film shape.

The molded product may be used as, for example, a monolayer film-like structure. The molded product may be suitably used as a packaging material for food and beverages, a packing material for containers, a material for medical infusion bags, a tube material for tires, or a cushion material for shoes.

<Multilayer Structure>

The multilayer structure according to yet another embodiment of the present invention has a layer formed from the resin composition, i.e., the molded product in a film shape. An improvement of the moisture resistance and mechanical characteristics of the multilayer structure is enabled, by virtue of having the layer formed from the resin composition. The number of layers in the multilayer structure is not particularly limited as long as the number is 2 or more, and is, for example, 2 or more and 10 or less, and preferably 3 or more and 5 or less.

The multilayer structure has, for example, at least one layer formed from the resin composition (resin composition layer) and at least one layer formed from other material. As the other material, a suitable material may be appropriately selected according to required characteristics, intended use, and the like. Examples of the other material include: polyolefins such as high density polyethylene, medium density polyethylene, low density polyethylene, linear low density polyethylene, an ethylene-propylene copolymer, and polypropylene; thermoplastic polymers such as an ethylene-vinyl acetate copolymer, an ethylene-acrylic acid ester copolymer, polystyrene, a vinyl chloride resin, and vinylidene chloride; ionomers; and the like.

In the multilayer structure, an adhesive layer or an adhesive may be provided between the resin composition layer and the layer formed from the other material. By virtue of the adhesive layer or the adhesive being provided, two layers adjacent thereto can be firmly and integrally joined to each other. As the adhesive layer or the adhesive, an acid anhydride modified product of a diene polymer, an acid anhydride modified product of a polyolefin, a mixture of a polymeric polyol and a polyisocyanate compound, and the like may be used. However, in the case in which the layer formed from the other material is a polyolefin layer, provision of the adhesive layer or the adhesive is of little significance, resulting from superior interlayer adhesiveness even without the adhesive layer or the adhesive. It is to be noted that a well-known procedure such as coextrusion, coinjection, extrusion coating, etc. may be employed for forming a laminated structure of the multilayer structure.

The multilayer structure is superior in gas barrier properties and flexibility in a well-balanced manner, and may therefore be used for commodities, packaging materials, machine components, etc. requiring these characteristics. Examples of a use that particularly effectively leverages features of the multilayer structure include: a packaging material for food and beverages; a packing material for containers; a material for medical infusion bags; a tube material for tires; a cushion material for shoes; a container; an inner bag material for bag-in-boxes; a material for organic liquid storage tanks; a material for organic liquid feed pipes; a material for hot water pipes for heating (e.g., a material for hot water pipes for floor heating); resin wall papers; and the like. Of these, a packaging material for food and beverages, a packing material for containers, a material for medical infusion bags, a tube material for tires, and a cushion material for shoes are particularly suitable uses.

EXAMPLES

Hereinafter, the present invention is explained in detail by way of Examples; however, the present invention is not limited to these Examples. Characteristics of the EVOH (A), the block copolymer (B), and the resin composition were evaluated by the method described below. The results are shown in Table 1.

Ethylene Content and Degree of Saponification of EVOH (A)

The ethylene content and the degree of saponification of EVOH (A) were determined through $^1$H-NMR measurement by using "JNM-GX-500" manufactured by JEOL, Ltd. as a measurement apparatus and DMSO-$d_6$ as a solvent.

Melt Flow Rate (MFR)

The melt flow rate was determined by measuring a flow rate (g/10 min) of a sample by using a melt indexer ("L244" manufactured by Takara Kogyo K.K.) under conditions involving a temperature of 230° C. and a load of 2,160 g.

Melting Point (Tm), Glass Transition Temperature (Tg), and Exothermic Peak Temperature (Tpc)

By using a differential scanning calorimeter (DSC) ("Q2000" manufactured by TA Instruments), following heating from 20° C. to 235° C. at a rate of 10° C./min, an exothermic peak temperature (Tpc) was detected through cooling down to 0° C. at a rate of 50° C./min, and then a melting point (Tm) and a glass transition temperature (Tg) were measured through heating again from 0° C. to 255° C. at a rate of 10° C. The measurements were conducted in accordance with JIS K 7121: 2012. It is to be noted that "exothermic peak temperature 1" presented in Table 1 means an exothermic peak temperature observed within a temperature range of 130° C. or greater and 170° C. or less, corresponding to the higher peak top temperature. Meanwhile, "exothermic peak temperature 2" as referred to means an exothermic peak temperature observed within a temperature range of 100° C. or greater and less than 130° C., corresponding to the lower peak top temperature. A DSC chart for the resin composition obtained in Example 1 (described later) is shown in FIG. 1.

Example 1

An EVOH (A1) having the ethylene content of 32 mol %, the degree of saponification of 99 mol % or greater, and the MFR (230° C.; 2,160 g) of 6.3 g/10 min was provided. In addition, a styrene-isobutylene-styrene triblock copolymer (B1) having a styrene content of 24% by mass, and isobutylene content of 76% by mass, and the MFR (230° C.; 2,160 g) of 11.4 g/10 min was provided. 60 parts by mass of the EVOH (A1) and 40 parts by mass of the block copolymer (B1) were dry blended. A mixture thus obtained was melt-kneaded under the following conditions, and then pelletized and dried to obtain pellets of the resin composition of Example 1.

apparatus: 26 mmφ twin-screw extruder ("Laboplast Mill 4C150" manufactured by Toyo Seiki Seisaku-sho, Ltd.);
    L/D: 25;
    screw: fully intermeshing co-rotation type;
    number of die holes: 2 (3 mmφ);
    extrusion temperature: 200° C. (C1), 230° C. (C2 to C5), 230° C. (die); and
    drying: hot-air drying at 80° C. for 6 hrs.

Formation of Monolayer Film

The resin composition of Example 1 being obtained was formed into monolayer films having average thicknesses of 20 μm and 100 μm, respectively, under the following conditions.

apparatus: 20 mmφ single screw extruder ("Laboplast Mill 4M150" manufactured by Toyo Seiki Seisaku-sho, Ltd.);
    L/D: 20;
    screw: full flight;
    die: 300 mm coat hanger die;
    extrusion temperature: 180° C. (C1), 220° C. (C2 and C3), 220° C. (die);
    screen: 50/100/50; and
    cooling roll temperature: 40° C.

Preparation of Test Piece

A test piece was prepared from the obtained resin composition by injection molding under the following conditions.

apparatus: injection molding machine "FS-80S 12AS" (manufactured by Nissei Plastic Industrial Co., Ltd.);
    cylinder temperature: 200° C./220° C./220° C./200° C.=rear/middle/front/nozzle;
    die temperature: 60° C.; and
    die: 4 dies of 80 mm×10 mm×4 mm Formation of Multilayer Film A two-type/three-layer multilayer film having an average total thickness of 260 μm (layer structure: PP layer (1)/layer of resin composition of Example 1/PP layer (2)=120 μm/20 μm/120 μm) was obtained by using a feed block type multilayer film extrusion molding machine comprising three extruders through: charging polypropylene (hereinafter, may be also referred to as "PP") into two extruders; charging the resin composition of Example 1 into a remaining extruder; and then conducting melt film formation. Extrusion conditions were as follows.

Production Conditions of Multilayer Film apparatus: feed block type multilayer film extrusion molding machine;
    die temperature: 230° C.; and
    cooling roll temperature: 70° C.

Conditions of Extruder for PP Layer (1)

extruder: 32φ single screw extruder; and
    extrusion temperature: feeding zone/compression zone/metering zone=170° C./220° C./220° C.

Conditions of Extruder for PP Layer (2)

extruder: 20φ single screw extruder; and
    extrusion temperature: feeding zone/compression zone/metering zone=170° C./220° C./220° C.

Conditions of Extruder for Resin Composition Layer extruder: 20φ single screw extruder; and
    extrusion temperature: feeding zone/compression zone/metering zone=170° C./220° C./220° C.

Examples 2 to 5

Resin compositions, monolayer films, test pieces, and multilayer films were produced in a similar manner to Example 1, except that the EVOH and the block copolymer of the types and the amounts shown in Table 1 were employed. Here, the block copolymer (B2) employed in Example 2 was a blend of a styrene-isobutylene-styrene triblock copolymer and a styrene-isobutylene diblock copolymer, having a styrene content of 24% by mass, an isobutylene content of 76% by mass, and the MFR (230° C.; 2,160 g) of 16.2 g/10 min. An EVOH (A2) employed in Example 3 was an EVOH having the ethylene content of 32 mol %, the degree of saponification of 99 mol % or greater, and the MFR (230° C.; 2,160 g) of 18.2 g/10 min. An EVOH (A3) employed in Example 4 was an EVOH having the ethylene content of 27 mol %, the degree of saponification of 99 mol % or greater, and the MFR (230° C.; 2,160 g) of 7.1 g/10 min. An EVOH (A4) employed in Example 5 was an EVOH having the ethylene content of 44 mol %, the degree of saponification of 99 mol % or greater, and the MFR (230° C.; 2,160 g) of 5.4 g/10 min.

Comparative Examples 1 to 6

Resin compositions, monolayer films, test pieces, and multilayer films were produced in a similar manner to Example 1, except that the EVOH and the block copolymer of the types and the amounts shown in Table 1 were employed. The block copolymer (B3) employed in Comparative Example 5 was a styrene-isobutylene-styrene triblock copolymer, having a styrene content of 24% by mass, an isobutylene content of 76% by mass, and the MFR (230° C.; 2,160 g) of 4.9 g/10 min.

The monolayer films, the test pieces, and the multilayer films obtained in Examples and Comparative Examples were subjected to the following evaluations.

Transmission Electron Microscope (TEM) Observation

Figure 2:
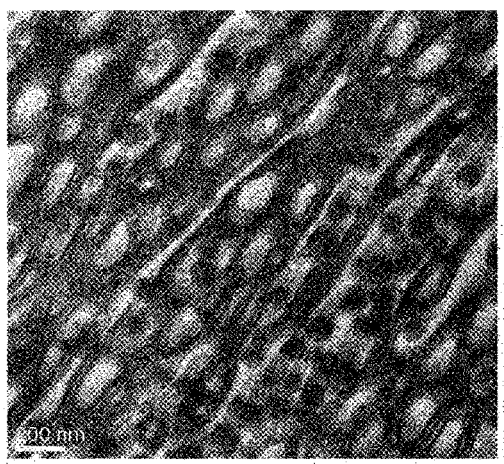
FIG. 2 shows a transmission electron micrograph of a monolayer film obtained in Example 1.
Figure 3:
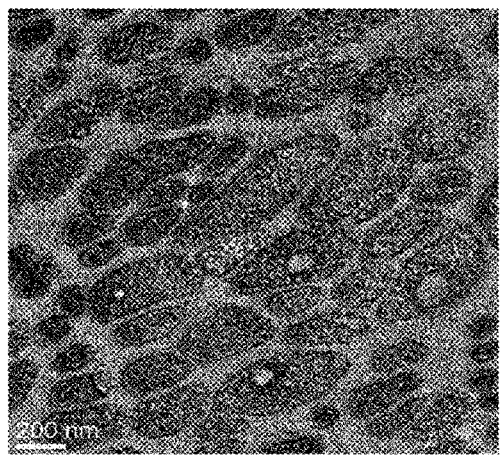
FIG. 3 shows a transmission electron micrograph of a monolayer film obtained in Comparative Example 6.

The monolayer film having an average thickness of 20 μm was cut out and embedded in an epoxy resin such that an observation in a MD (machine direction) was enabled. Thereafter, by using an ultramicrotome ("Reichert ULTRACUT-UC7" manufactured by Leica Microsystems GmbH), an ultra thin section having an average thickness of 90 nm to 100 nm was produced. A TEM observation was conducted for the ultra thin section being obtained, by using a field emission type transmission electron microscope ("JEM-2100F" manufactured by JEOL, Ltd.) under a condition of an accelerating voltage of 200 kV, and then a morphology was evaluated on the basis of a TEM micrograph being obtained. A TEM micrograph of Example 1 is shown in FIG. 2, and a TEM micrograph of Comparative Example 6 is shown in FIG. 3. It is to be noted that styrene blocks of the block copolymer (B) are observed to be black in FIGS. 2 and 3.

Oxygen Transmission Rate (OTR)

The aforementioned monolayer film having an average thickness of 20 μm was conditioned under a condition of 20° C./65% RH, and then an oxygen transmission rate (OTR) (cc·20 μm/(m²·day·atm)) was measured by using an oxygen transmission rate measurement device ("OX-Tran2/20" manufactured by Modern Controls. Inc.), under a condition of 20° C./65% RH or 20° C./85% RH. As to the monolayer films of Examples 2 to 5, only an oxygen transmission rate under the condition of 20° C./65% RH was measured. The results are shown in Table 1. A smaller value of the oxygen transmission rate indicates superior gas barrier properties, and under the condition of 20° C./65% RH, the OTR of 200 or less (cc·20 μm/(m²·day·atm)) may be determined to be "favorable", whereas the OTR of greater than 200 (cc·20 μm/(m²·day·atm)) may be determined to be "not favorable".

Storage Elastic Modulus

Storage elastic moduli (MPa) at 160° C., 23° C., and −40° C. of the monolayer film having an average thickness of 100 μm were evaluated by measuring a dynamic viscoelasticity thereof by using a dynamic viscoelasticity measurement device ("Rheogel E4000" manufactured by UPM), under the following conditions. Since the monolayer film of Example 5 melted at 160° C., the storage elastic modulus thereof at 140° C. was evaluated. The results are shown in Table 1.
Measurement mode: temperature dependent;
measured temperature range: −120° C. to 170° C.;
rate of temperature rise: 3° C./min;
fundamental frequency: 11 Hz; and
sample size: 20 mm×5 mm×100 μm.

Izod Impact Strength

A notch was formed in the aforementioned test piece (80 mm×10 mm×4 mm) obtained by injection molding in accordance with JIS K 7110: 1999, and then an Izod impact strength (kJ/m²) was measured by using a digital impact tester (manufactured by Toyo Seiki Seisaku-sho, Ltd.), under conditions of 23° C. and −20° C. The results are shown in Table 1. The Izod impact strength indicates energy being absorbed upon applying an impact to break a test piece, and a greater value indicates superior toughness. "Bent" presented in Table 1 means that the test piece was not broken under the aforementioned conditions, indicating particularly superior toughness. The Izod impact strength may be determined to be "favorable" when the test piece was not broken under the condition of 23° C., i.e., the case indicated as "bent" in Table 1, whereas the Izod impact strength may be determined to be "not favorable" in any other case.

Peeling Strength

The aforementioned multilayer film was cut into a strip of 15 mm in width and 12 cm in length, and then delaminated between the resin composition layer and the PP layer. Using a tensile testing machine ("Autograph AGS-H" manufactured by Shimadzu Corporation), delaminated parts were chucked, then a T-peel test was conducted under conditions involving a distance between chucks of 50 mm and a strain rate of 250 mm/min, and a peeling strength (g/15 mm) was calculated from a load applied upon peeling. The results are shown in Table 1. A greater value of the peeling strength indicates superior interlayer adhesiveness between the resin composition layer and the PP layer, and the peeling strength of 100 g/15 mm or greater may be evaluated to be "favorable", whereas the peeling strength of less than 100 g/15 mm may be evaluated to be "not favorable". Since the multilayer film of Comparative Example 4 had a great adhesion strength and thus could not be delaminated for chucking, peeling strength could not be evaluated due to a failure to obtain the test piece for the T-peel test.

TABLE 1

|  |  |  | Example 1 | Example 2 | Example 3 | Example 4 | Example 5 |
|---|---|---|---|---|---|---|---|
| EVOH(A) | Type |  | (A1) | (A1) | (A2) | (A3) | (A4) |
|  | MFR (230° C./2, 160 g) | g/10 min | 6.3 | 6.3 | 18.2 | 7.1 | 5.4 |
|  | Content | Parts by mass | 60 | 60 | 55 | 60 | 60 |
| Block Copolymer (B) | Type |  | (B1) | (B2) | (B1) | (B1) | (B1) |
|  | MFR (230° C./2, 160 g) | g/10 min | 11.4 | 16.2 | 11.4 | 11.4 | 11.4 |
|  | Content | Parts by mass | 40 | 40 | 45 | 40 | 40 |
| TEM Observation Result | Morphology |  | Co-continuous Phase | Co-continuous Phase | Co-continuous Phase | Co-continuous Phase | Co-continuous Phase |
|  | Continuous Phase |  | (A1)/(B1) | (A1)/(B2) | (A2)/(B1) | (A3)/(B1) | (A4)/(B1) |

TABLE 1-continued

| | | | | | | | |
|---|---|---|---|---|---|---|---|
| DSC | Melting Point | °C. | 180 | 179 | 181 | 187 | 161 |
| | Glass Transition Temperature | °C. | 62 | 61 | 64 | 64 | 53 |
| | Exothermic Peak Temperature 1 | °C. | 152 | 152 | 153 | 161 | 136 |
| | Exothermic Peak Temperature 2 | °C. | 120 | 119 | 118 | 125 | 102 |
| OTR | 20° C./65% RH | cc · 20 μm/ (m² · day · atm) | 15.5 | 55.8 | 102.0 | 37.3 | 13.9 |
| | 20° C./85% RH | | 42.0 | — | — | — | — |
| Storage Elastic Modulus | 160° C. | MPa | 17.2 | 15.3 | 16.7 | 22.8 | 10.0* |
| | 23° C. | MPa | 790 | 770 | 930 | 960 | 830 |
| | −40° C. | MPa | 2,270 | 2,120 | 2,040 | 2,820 | 1,980 |
| Izod Impact Strength | 23° C. | kJ/m² | Bent | Bent | Bent | Bent | Bent |
| | −20° C. | kJ/m² | 23.8 | 25.2 | 23.4 | 24.2 | 27.5 |
| Peeling Strength | PP/Resin Composition/PP | g/15 mm | 250 | 280 | 280 | 300 | 270 |

| | Comparative Example 1 | Comparative Example | Comparative Example 3 | Comparative Example 4 | Comparative Example 5 | Comparative Example 6 |
|---|---|---|---|---|---|---|
| EVOH(A) | (A1) | (A1) | (A1) | (A1) | (A1) | (A2) |
| | 6.3 | 6.3 | 6.3 | 6.3 | 6.3 | 18.2 |
| | 100 | 70 | 65 | 55 | 60 | 60 |
| Block Copolymer (B) | — | (B1) | (B1) | (B1) | (B3) | (B1) |
| | 11.4 | — | 11.4 | 11.4 | 4.9 | 11.4 |
| | 0 | 30 | 35 | 45 | 40 | 40 |
| TEM Observation Result | — | Sea-Island Structure (A1) | Sea-Island Structure (A1) | Sea-Island Structure (B1) | Sea-Island Structure (A1) | Sea-Island Structure (A2) |
| DSC | 183 | 181 | 181 | 180 | 181 | 182 |
| | 57 | 63 | 62 | 65 | 62 | 62 |
| | 158 | 154 | 153 | — | 151 | 152 |
| | — | — | — | 119 | 118 | — |
| OTR | 0.4 | 0.6 | 0.7 | 470 | 1.0 | 0.9 |
| | 1.5 | 3.1 | 4.2 | 630 | 6.2 | 4.9 |
| Storage Elastic Modulus | 57.4 | 26.7 | 20.0 | 3.84 | 15.9 | 32.4 |
| | 3,260 | 1,950 | 1,370 | 325 | 1,350 | 1,390 |
| | 4,910 | 3,270 | 2,760 | 2,060 | 2,570 | 2,280 |
| Izod Impact Strength | 4.1 | 75.1 | 53.2 | Bent | 33.1 | 30.2 |
| | 3.3 | 12.9 | 15.6 | Bent | 13.2 | 13.8 |
| Peeling Strength | <5 | <5 | <5 | — | <5 | <5 |

*Storage elastic modulus at 140° C.

As is clear from Table 1, the monolayer films, the test pieces, and the multilayer films formed from the resin compositions of Examples, respectively, were superior in: the gas barrier properties; the flexibility (lowness of the storage elastic modulus) and toughness at 23° C.; and the interlayer adhesiveness, as compared to the monolayer films, the test pieces, and the multilayer films formed from the resin compositions of Comparative Examples, respectively.

INDUSTRIAL APPLICABILITY

The resin composition according to the one aspect of the present invention is able to give a molded article that is superior in balance between gas barrier properties and flexibility, and in adhesiveness to a polyolefin layer. The resin composition according to the one aspect of the present invention is suitably used for a molded product and a multilayer structure. The molded product and the multilayer structure can be suitably used as a packaging material for food and beverages, a packing material for containers, a material for medical infusion bags, a tube material for tires, a cushion material for shoes, and the like.

The invention claimed is:
1. A resin composition, comprising:
an ethylene-vinyl alcohol copolymer (A); and
a block copolymer (B) comprising a block (b1) that includes a vinyl aromatic monomer unit and a block (b2) that includes an isobutylene unit,
wherein:
the ethylene-vinyl alcohol copolymer (A) and the block copolymer (B) form a co-continuous phase structure;
a DSC curve obtained by cooling the resin composition at a rate of 50° C./min after heating the resin composition up to a melting point in a differential scanning calorimetry analysis shows two peaks, with a higher peak top temperature falling within a range of 130° C. or greater and 170° C. or less, and a lower peak top temperature falling within a range of 100° C. or greater and less than 130° C.; and
a mass ratio of the ethylene-vinyl alcohol copolymer (A) to the block copolymer (B) is 52/48 or greater and 63/37 or less.
2. The resin composition according to claim 1, wherein, at a temperature of 230° C. and under a load of 2,160 g, a melt flow rate of the ethylene-vinyl alcohol copolymer (A) is less than a melt flow rate of the block copolymer (B).
3. The resin composition according to claim 1, wherein a film having a thickness of 100 μm formed from the resin composition has a storage elastic modulus at 23° C. of 600 MPa or greater and 1,200 MPa or less, as determined by a method in accordance with JIS K 7244-4: 2010 for measuring a dynamic viscoelasticity.
4. A molded product, formed from the resin composition according to claim 1.
5. The molded product according to claim 4, which is a packaging material for food and beverages, a packing mate- rial for containers, a material for medical infusion bags, a tube material for tires, or a cushion material for shoes.

6. A multilayer structure, comprising
a layer formed from the resin composition according to claim 1.

7. The multilayer structure according to claim 6, which is a packaging material for food and beverages, a packing material for containers, a material for medical infusion bags, a tube material for tires, or a cushion material for shoes.

8. The resin composition according to claim 1, wherein a melt flow rate of the ethylene-vinyl alcohol copolymer (A) at a temperature of 230° C. and under a load of 2,160 g is from 5.0 to 20 g/10 min.

9. The resin composition according to claim 1, wherein the block (b1) is constituted with styrene units.

10. The resin composition according to claim 1, wherein a number average molecular weight of the block (b1) is from 5,000 to 200, 000.

11. The resin composition according to claim 1, wherein a number average molecular weight of the block (b2) is from 10,000 to 400, 000.

12. The resin composition according to claim 1, wherein a number average molecular weight of the block copolymer (B) is from 30,000 to 400, 000.

13. The resin composition according to claim 1, wherein a melt flow rate of the block copolymer (B) at a temperature of 230° C. and under a load of 2,160 g is from 5.0 to 20 g/10 min.

14. The resin composition according to claim 1, wherein the block copolymer (B) comprises at least one functional group selected from the group consisting of: a hydroxyl group; an amino group; an alkylamino group; an ether group; an ester group; an amide group; and a group having a structure of a dicarboxylic acid anhydride.

15. The resin composition according to claim 1, wherein the mass ratio of the ethylene-vinyl alcohol copolymer (A) to the block copolymer (B) is 57/43 or greater and 61/39 or less.

16. The resin composition according to claim 1, wherein a value obtained by subtracting a melt flow rate of the block copolymer (B) at a temperature of 230° C. and under a load of 2,160 g from a melt flow rate of the ethylene-vinyl alcohol copolymer (A) at a temperature of 230° C. and under a load of 2,160 g, is from 3 to 10 g/10 min.

* * * * *